United States Patent [19]

Kuroki

[11] Patent Number: 5,469,697

[45] Date of Patent: Nov. 28, 1995

[54] STUD LINK CHAIN

[75] Inventor: Katsuhiko Kuroki, Himeji, Japan

[73] Assignee: Kuroki Chain Mfg., Co., Ltd., Hyogo, Japan

[21] Appl. No.: 116,692

[22] Filed: Sep. 7, 1993

[51] Int. Cl.⁶ ............................. B21L 3/00; F16G 15/02
[52] U.S. Cl. ........................... 59/35.1; 59/84; 59/31
[58] Field of Search ....................... 59/85, 30, 31, 59/35.1, 84

[56] References Cited

U.S. PATENT DOCUMENTS

| | | | |
|---|---|---|---|
| 857,449 | 6/1907 | Currie | 59/84 |
| 1,614,900 | 1/1927 | Ryan | 59/35.1 |
| 2,368,271 | 1/1945 | St Pierre | 59/35.1 |
| 2,398,898 | 4/1946 | St Pierre | 59/84 |
| 2,426,066 | 8/1947 | St Pierre | 59/35.1 |
| 2,426,067 | 8/1947 | St. Pierre | 59/35.1 |
| 2,480,788 | 8/1949 | St Pierre | 59/85 |
| 2,714,798 | 8/1955 | Linnenbank | 59/35.1 |
| 3,864,906 | 2/1975 | Cullen | 59/84 |
| 4,498,284 | 2/1985 | Gearhart | 59/84 |

FOREIGN PATENT DOCUMENTS

| | | | |
|---|---|---|---|
| 0456352 | 8/1913 | France | 59/35.1 |
| 0796768 | 4/1936 | France | 59/84 |
| 0811895 | 4/1937 | France | 59/35.1 |
| 2358812 | 3/1978 | France | 59/84 |
| 55-31677 | 6/1980 | Japan . | |
| 623848 | 9/1987 | Japan . | |

Primary Examiner—David Jones
Attorney, Agent, or Firm—Birch, Stewart, Kolasch & Birch

[57] ABSTRACT

The present invention provides a die forged stud link chain which comprises substantially θ-shaped complete stud links (1) (FIG. 2) formed by means of die forging and substantially ε- shaped semi-finished stud links (2) (FIG. 3) feasible to be formed into a exceeding 45°. The stud link chain can be produced mainly by using a die forging process and a minimum welding process, so that a decrease in the shearing stress applied to the shoulder part due to bending can be avoided. Further, steel materials superior in decrease of the shearing stress and in the tensile strength can be employed. The resulting stud link chain is lightweight and superior in resistance to fatigue failure.

16 Claims, 8 Drawing Sheets

| SAMPLE | NUMBER OF ABRASION | DIAMETER (mm) | QUANTITY (mm) | RATIO (%) |
|---|---|---|---|---|
| INVENTION | 0 | 35.7 | | |
| | 10.080 | 35.0 | 0.7 | 2.0 |
| | 20.160 | 32.2 | 3.5 | 10.0 |
| | 30.240 | 30.1 | 5.6 | 16.0 |
| | 40.320 | 28.9 | 6.8 | 19.0 |
| PRIOR ART | 0 | 32.4 | | |
| | 10.080 | 31.1 | 1.3 | 4.0 |
| | 20.160 | 28.0 | 4.4 | 14.0 |
| | 30.240 | 26.3 | 6.1 | 19.0 |
| | 40.320 | 24.3 | 8.1 | 25.0 |

FIG. 13

STUD LINK CHAIN

The present invention relates to a stud link chain lighter than conventional ones, and to a method and a device for producing the stud link chain, by which tensile shearing stress and years of endurance can be increased.

BACKGROUND OF THE INVENTION

Conventionally, as chains used in a ship windlass or a cargo-handling machine and so on, a substantially θ-shaped stud link 5 comprising O-shaped link 3 and stud 4 which connects the middle part of the link 3 is widely used for increasing the tensile shearing stress in the longitudinal direction or for preventing entanglement of the links. As shown in FIG. 5, this kind of chain is formed in such a manner that a round-bar type steel material 10 is heated up to 850°–900° C. by an electric resistance heater and then is bent into a C-shape and opening ends 31, 31 of the C shape are connected with each other by means of electric resistance welding, then flashing 32 in the welded part is removed and a stud 4 is inserted and fixed by pressing. Especially when strength in a stud part is required, usually $CO_2$ gas arc welding is applied to the stud end fixed to the link.

In the above mentioned production methods, (1) a bar-type steel material having a uniform section is bent to an angle of 180° C., and thereby the bent corner part (so called a shoulder part) comes to have a slightly smaller diameter compared with the other parts, resulting in that the tensile stress of the chain is susceptible to act on this shoulder part and fatigue failure starting from here easily takes place. Further, (2) according to the conventional method in which the studs are fixed by pressing, as a result of repeated use, deformation stress acts on the outer periphery of the link, or the studs may fall off due to the rust. According to the method in which an end of each stud is welded for fixation, it is disadvantageous that as a result of repeated use, the welded point is apt to cause fatigue failure due to the deformation stress acted on the outer periphery of the link. Especially for these chains used in conveyors or for the fishery purpose, in which the tensile strength is placed on the studs upon driving, even increased strength is required in the studs.

Moreover, (3) for the purpose of traction and support of marine structures, lightweight materials also showing a high tensile strength, such as SUS or chromium molybdenum for example, may be proposed. However, a problem of weldability arises and production according to the conventional methods is difficult.

Further, (4) each connected part in the chain wears due to the friction, as shown by the shadowed portion m in FIG. 6, namely, the service life of the chain is usually determined by the remaining diameter b. In the conventional chain, since the sectional shape is uniform, the diameter of the section must be increased to gain the service life of the chain. However this cannot be employed, since it accompanies with the significant increase in chain weight.

For the purpose of improving fatigue strength of this kind of chain, link chains according to Japanese Patent Tokkaisho No.55-31677 and No. 62-3848 have been proposed. In both link chains, however, a bar steel is formed into an O-link by bending the bar steel to a maximum angle of 180° C., which remains the fundamental problem of fatigue failure due to shearing stress applied to the shoulder part upon pulling the chain in the longitudinal direction.

SUMMARY OF THE INVENTION

For the purpose of overcoming the above mentioned problems resulting from the production methods in which a bar steel having a uniform section is bent, an object of the present invention is to provide a stud link chain which is light weight and shows a high resistance to the tensile strength in the longitudinal direction.

According to a first aspect of the present invention, from the inventive knowledge that the increased sectional areas of the shoulder part, to which the shearing stress is apt to applied and the parts on which the abrasion loss is centered, makes the tensile strength corresponding to that of the shoulder part increased and the decreased sectional areas of the other part of the link in a way to match the other part strength to that of the shoulder, makes the link weight link decreased and however a link in such a ununiform sectional shape cannot be produced by the conventional methods, there is provided a producing method for a die forged stud link chain characterized in that: a stud link to be connected is formed into a substantially θ-shaped complete stud link 1 in which a link part 11 and a stud part 12 are formed integrally by means of die forging, the other stud link to be connected is formed by means of die forging into a substantially ϵ-shaped semi-finished stud link 2, which comprises a link part 21, a pair of released ends 24, 24 releasing one side of a fixed part of a stud part 22, and a released end 22b of the stud, the released ends 24, 24 of the semi-finished stud link 2 are inserted in openings or spacings 13, 14, respectively, of both adjacent complete stud links 1, 1 for connection, long-side parts 21B, 21B of the link extending outward from a fixed end 22a of the stud part 22 of the semi-finished stud link 2 are bent inward to an angle of 45°, and preferably to an angle of not exceeding 30° to form substantially a θ-shaped, and as least a butted part 25 of the released ends, 24, 24 are welded to join a chain.

According to the method of the present invention, since the stud links to be connected are pressed by means of die forging in a way that one link has a substantially θ-shape and the other link has a substantially ϵ-shape, (1) the sectional shape of each link need not be uniform unlike the conventional one and various sectional shapes can be employed. For example, a diameter of the short-side part in the longitudinal direction of the outer periphery of the link is made bigger than an average diameter and a diameter of the long-side part in the longitudinal direction is made smaller than the average diameter, by which the link can be made lighter than the conventional ones and have improved in the tensile strength.

Further, (2) each stud and the outer periphery of the link can be formed integrally, by which the tensile strength of each stud can be improved in comparison with the studs made by the conventional pressure welding or the welding. Especially when an attachment hole for a material is formed in each stud or when each stud is used as a drive of the chain, according to the conventional methods, the attachment hole is apt to be deformed or come off upon fixed and pressed to the outer periphery of the link, therefore the method of the present invention is advantageous.

Furthermore, (3) according to the present invention, the die forging makes the material strength of the link improved in comparison with the bending of a bar steel according to the conventional methods.

Moreover, (4) only the minimum welding, necessary for joining openings of a substantially ϵ-shaped link after bending into a substantially θ-shape, is required to produce a link chain. Consequently this results in minimizing the welded part which decreases the link strength. Further, due to the small welded portion, materials which have a difficulty in weldability but show superior resistance to the tensile strength, such as SCM steel materials, SUS materials and so on, comes to be able to be used for producing the links. Therefore, a link chain having excellent fatigue strength can be produced by the use of physical properties of these materials.

Accordingly a lightweight and new stud link chain having superior strength can be obtained according to the present invention, in which the substantially θ-shaped complete stud link 1 formed by the die forging and the substantially ε-shaped and partially released semi-finished link 2 feasible to be formed into the substantially θ-shape by bending to an angle of 45°, and preferably to an angle of 30° are combined in a chain and then the butt part of the semi-finished link 2 made by bending is welded. Such a stud link chain can not be obtained by the conventional methods.

In view of the production work, the stud link chain can be produced only by the minimum bending into the substantially θ-shape, accordingly production of the stud link chain need not hot working process which requires the maximum bending of 180° and can be realized even by cold bending process, and moreover the welded part can be minimized, by which man-hours in an unfavorable environment can be reduced.

To produce the above-mentioned die forged chain, bending process different from the conventional methods is employed, accordingly a particular producing device is required. As a result of researches, the most suitable method has been found. Namely, when bending the substantially ε-shaped semi-finished stud link 2 for connecting the substantially θ-shaped complete stud link 1, the substantially ε-shaped semi-finished stud link 2 needs to be held by its non-moving part. Therefore a stud part 22 is held so that bending stress is applied to both long-side link parts 21B, 21B extending to left and right from a fixed end 22a of the stud part 22. As to applying the bending stress thereto, it is preferable that a pressing against both long-side link parts 21B, 21B is employed to generate a butt force at each released end as shown in FIG. 7. Therefore each long-side link part 21B, 21B extending to left and right from the fixed end 22a of the stud part 22 is pushed from the inside to the outside while the pushing force applied to each long-side link part 21B, 21B is received by each curved part 21C, 21C, by which this receiving motion makes each short-side link part 21A pushed inward, thus both released end 24, 24 are butted together to substantially form the θ-shaped.

Therefore, according to a second aspect of the present invention, there is also provided an apparatus for bending a substantially ε-shaped semi-finished stud link 2 into a substantially θ-shape with being connected with a substantially θ-shaped stud link 1, which comprises a pair of pushing tools 5, 5 for holding the stud part 22 of the ε-shaped stud link and pushing each long-side link part 21B, 21B extending to left and right from the fixed end 22a of the stud part 22 from the inside to the outside; a pair of backing tools 6, 6 swingable around an axis perpendicular to a plane L including the stud link 2 for abutting each curved part 21C extending from the long-side link part 21B to the short-side part 21A to receive the pushing force applied to each long-side link part 21B, 21B at a first portion of the backing tool 6 and by this receiving motion making each short-side link part 21A pushed inward at a second portion thereof, thus both released end 24, 24 being butted together to substantially form the θ-shape.

BRIEF DESCRIPTION OF THE DRAWINGS

The invention will now be described by way of example with reference to the accompanying drawings in which:

FIG. 13 is a table showing measured diameters b, quantities of the abrasion mm and % of abrasion m/a, as shown in FIG. 6, for total numbers of the friction as to the chain of the present invention and the conventional chain.

DETAILED DESCRIPTION OF THE PREFERRED EMBODIMENT

Now the method for producing according to the present invention is explained in detail with reference to preferred embodiments.

EXAMPLE 1

Figure 1:
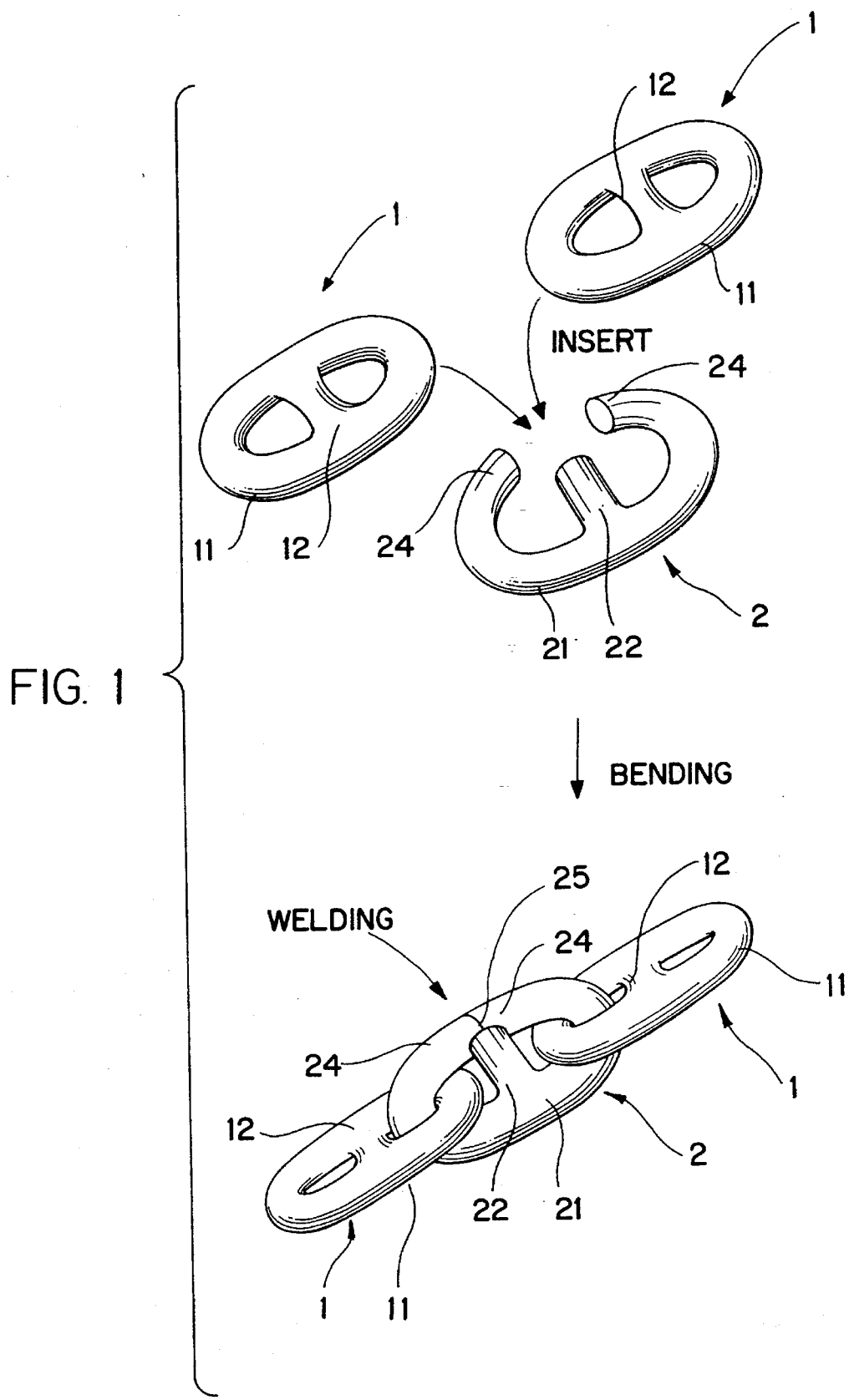
FIG. 1 shows a method of making stud link chain according to the present invention.

FIG. 1 shows a prospective view for explaining a process of the method according to the present invention. Each link part separated a stud 12 forms a substantially θ-shaped closed link 1. A pair of links 1 formed by die forging is inserted into a pair of released ends 24, 24, respectively, of a substantially ε-shaped semi-finished open link 2 formed by die forging. Then after the above-mentioned pair of released ends 24, 24 are bent to be brought into contact with each other, both released ends 24, 24 are welded to be joined with each other and make a link chain.

Figure 2:
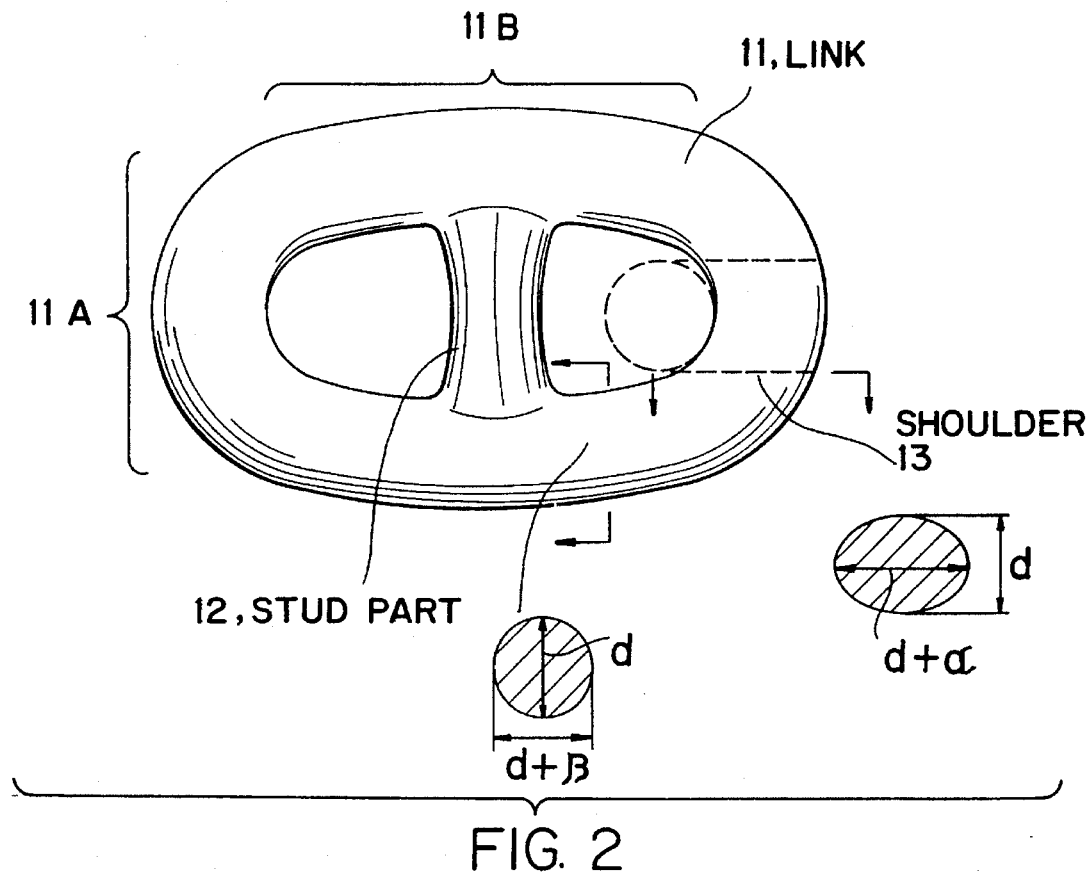
FIG. 2 is a plane view of a die forged, substantially θ-shaped link used in the prevent invention.

To form one of the open links to be later bent into a (closed) complete link, an outer peripheral link part 11 and the stud part 12 are integrally die forged. As illustrated in FIG. 2, the complete link 1 is substantially in a θ-shape and comprises short-side parts 11A, 11A and long-side parts 11B, 11B. The section of each shoulder part 13 of each short-side part 11A is an elliptical shape, in which the minor diameter in the vertical direction corresponds to an average diameter d of the link but the major diameter in the horizontal direction corresponds to d+α. α varies with an average diameter of the link but an increase of 10–15% and not exceeding 30% of the average diameter is suitable so that certain tensile strength is given to provide each shoulder part 13 with resistance to fatigue failure. On the other side, the sectional shape of each long-side part 11B is in an elliptical shape, in which the major diameter in the vertical direction equals the average diameter d of the link but the major diameter in the horizontal direction corresponds to d−β, shorter than the average diameter d. β varies with the average diameter of the link but may be determined so as to obtain strength corresponding to the tensile strength increased in each shoulder part 13. Namely suitable β should decrease the average diameter by 15–20% but not exceeding by 30%.

Figure 3:
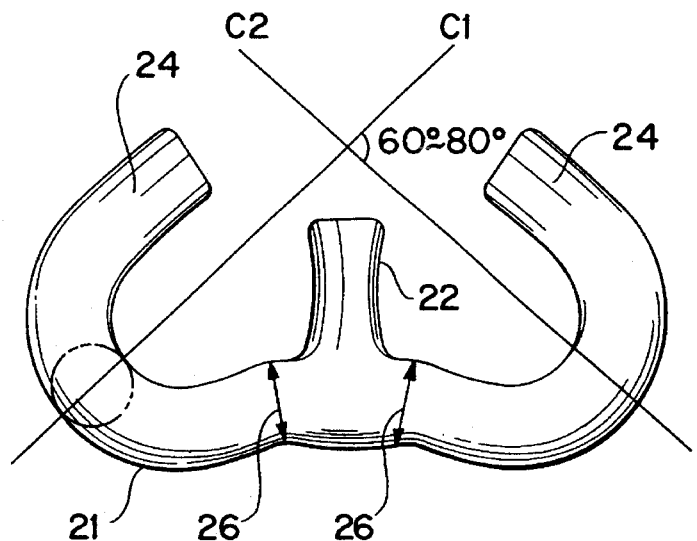
FIG. 3 is a plane view of a die forged, substantially ε-shaped link used in the present invention.
Figure 4:
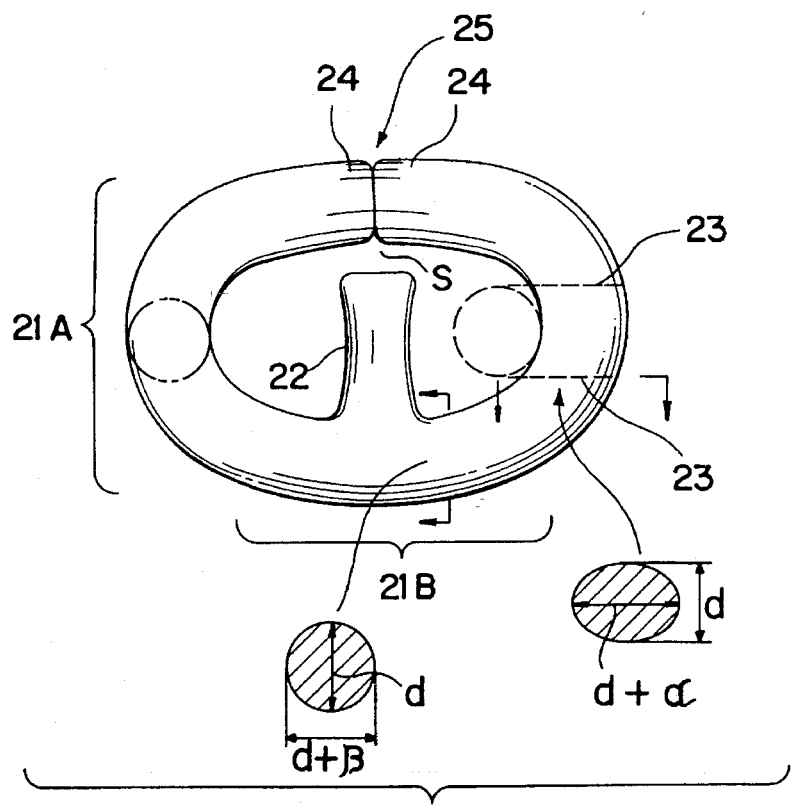
FIG. 4 is a plane view showing the connection of both released ends of the die forged link shown in FIG. 3.
Figure 5:
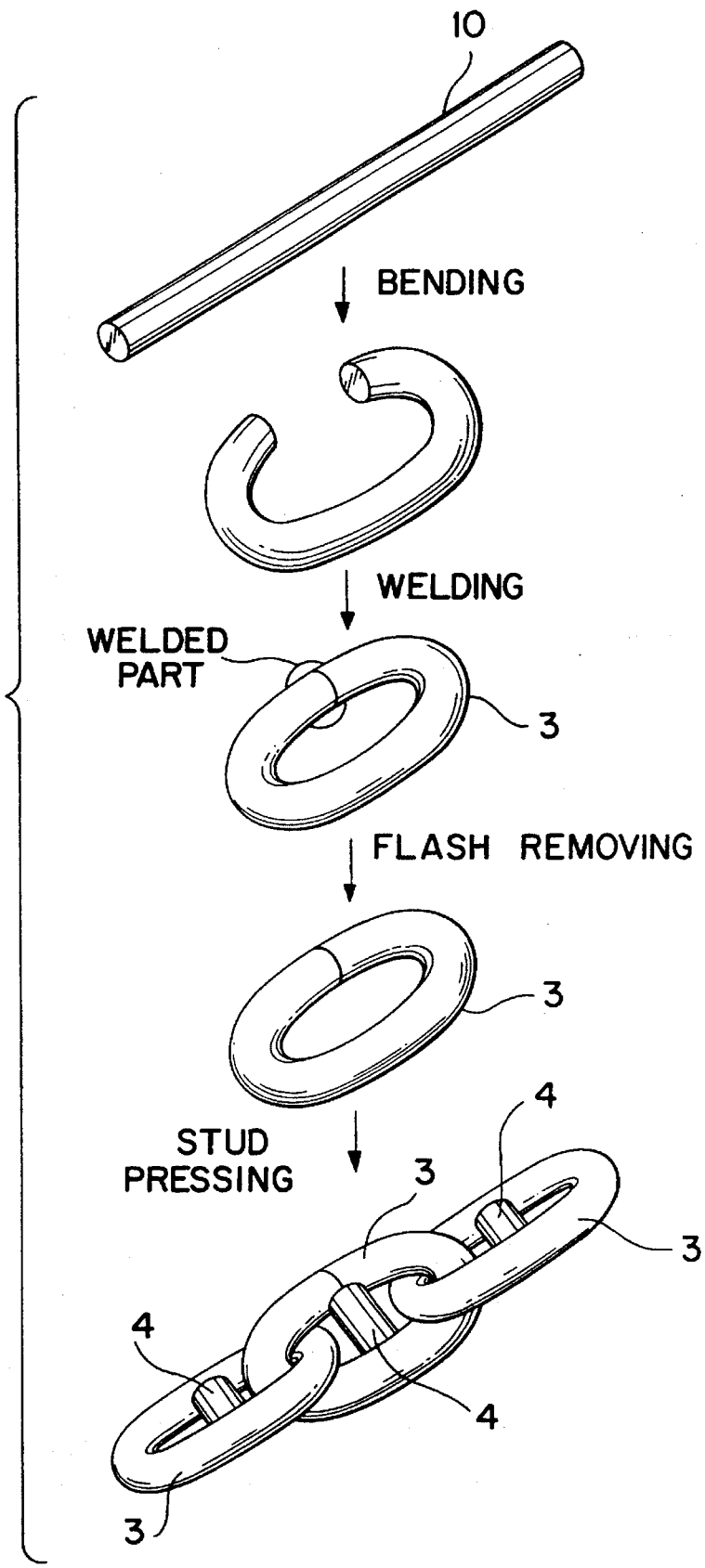
FIG. 5 shows a method of making stud link chain according to a conventional method.

As illustrated in FIG. 3, the sectional shape of each semi-finished link 2 for connecting a plurality of the complete links 1 is made in the same manner as that of each complete links. Namely, the sectional shape of each shoulder part 23 of each short-side part 21A forms a an elliptical shape, in which the minor diameter in the vertical direction corresponds to an average diameter d of the link but the major diameter in the horizontal direction is d+α. As to each long-side part 21B, the major diameter in the vertical direction corresponds to the average diameter d of the link but the minor diameter in the horizontal direction is d−β. An outer peripheral link 21 is released at the center of either one of long-side parts 21B. The preferable release is made so that the complete link 1 can be inserted through the released part, namely, to the extent that center lines C1 and C2 dividing both C-shaped sides of the link into two, intersect at an angle of 60°– 80°. A stud part 22 extrudes from the center of the other long-side part 21B so as to divide the center of the released part of the opposing long-side part 21B into two. Thus on the whole, each semi-finished link 2 is die forged to substantially form an ε-shape. A connecting part 26 between the stud part 22 and the outer peripheral link 21 is made slightly thick in consideration of reducing the sectional diameter by bending upon connection. Bending to an angle of less than 45°, and to an angle of approximately 30° in the drawing, is applied so as to bring both released ends 24, 24 into contact with each other and the periphery of the contacting part 25 is welded to obtain a closed link as shown in FIG. 4. At this time, there is a slight spacing S between the end of the stud part 22 and the contacting part 25 so that when the tension is applied in the longitudinal direction, the stud part 22 is brought into contact with the side part of the contacting part 25, by which the shearing stress applied to the above-mentioned shoulder part 23 is reduced. Needless to say, the end of the stud part 22 may be welded to the contacting part 25.

In the die forged link in the above-mentioned shape, for example, the average diameter d of the link was made 19 mm long, the major diameter and the minor diameter of elliptical section of each shoulder part 13 were made 22 mm and 19 mm long, respectively, and a major diameter and a minor diameter of the section of the long-side part 11B were made 19 mm and 15 mm long, respectively. Then while the whole weight was reduced by approximately 15%, the tensile strength was improved by approximately 15%, compared with a link chain produced by the conventional method by use of a bar steel having a diameter of 19 mm long.

EXAMPLE 2

By means of die forging, an attachment hole for a material was formed in the center of each stud in the above-mentioned stud link chain, and substantially θ-shaped complete links and substantially ε-shaped semi-finished links were connected with each other in the same manner as in Example 1. Then each blade part was attached to each link through each attachment hole so as to form a chain conveyor.

On the other hand, studs each having an attachment hole were tried to be fixed to a link chain by means of a conventional pressing method, but pressing from both ends made each attachment hole deformed. Alternatively, each attachment hole was tried to be provided by punching in each stud after a link chain has produced, but the operation was difficult and the mass production was impossible.

Comparing with the resistance to repeated use of the integral studs according to the present invention and the conventional studs fixed by pressing, the conventional studs are apt to slip off and it is also disadvantageous that falling off of one stud causes the other studs to fall off. To the contrary, this tendency is not shown in the integral studs according to the present invention.

Figure 7:
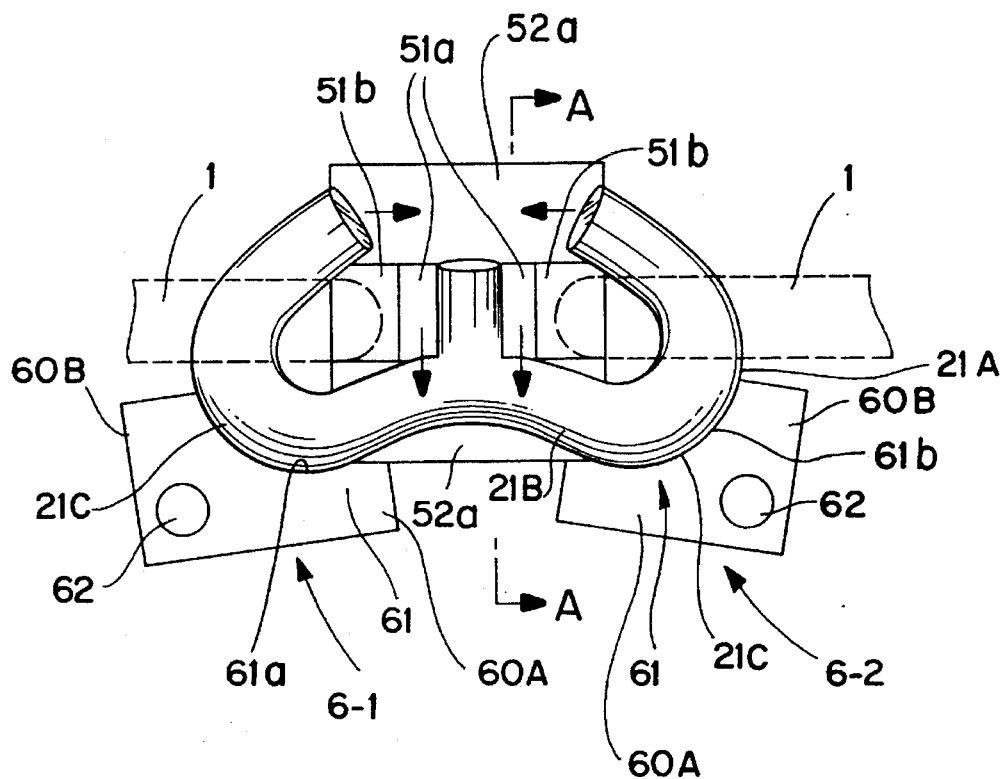
FIG. 7 is a plane view showing a device for bending and connecting the die forged, substantially ε-shaped link according to the present invention.
Figure 8:
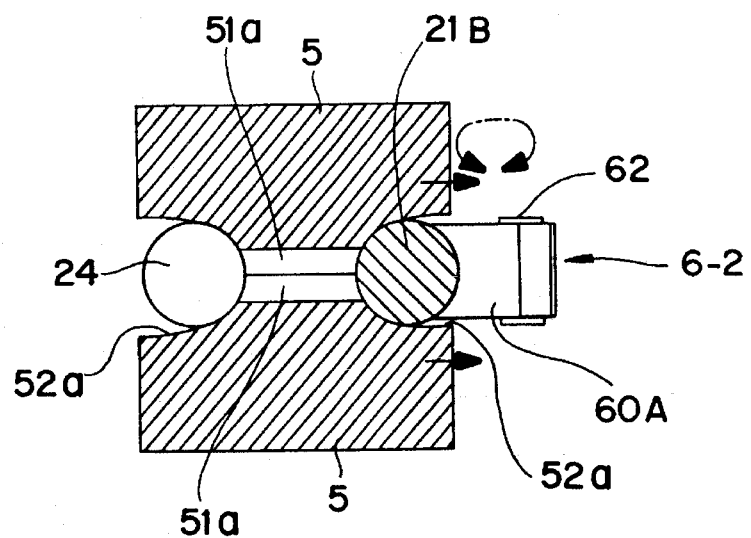
FIG. 8 is a sectional view taken from A—A line in FIG. 7.

FIG. 7 is a plane view showing a device for practicing the method of the present invention. FIG. 8 is a sectional view taken from A—A line in FIG. 7. As illustrated, the bending device comprises a pair of upper and lower holding and pressing tools 5, 5 and a pair of backing tools 6, 6.

Figure 9:
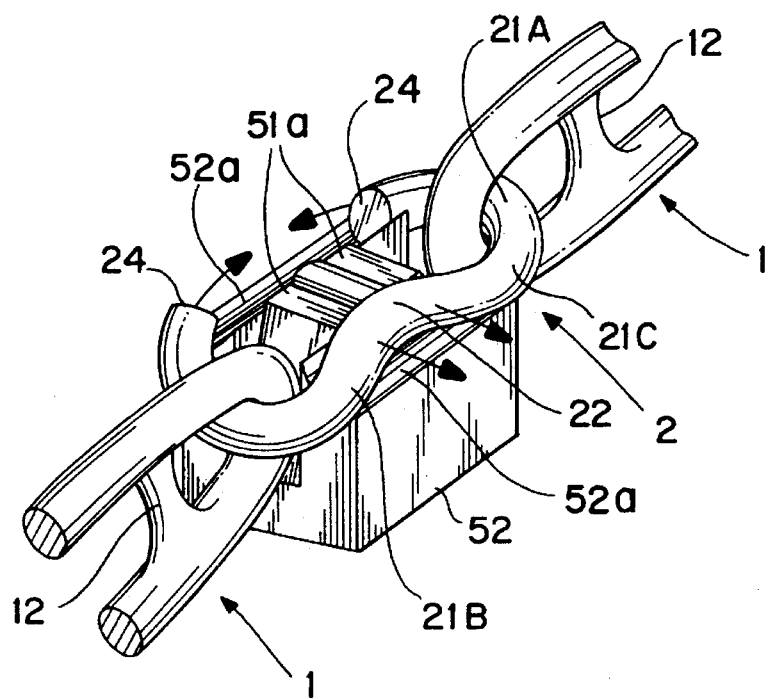
FIG. 9 is a perspective view showing assembling position of the die forged, substantially ε-shaped link mounted on a lower holding and pressing tool and the die forged, substantially θ-shaped links attached to both sides of the ε-shaped link before a bending operation.
Figure 10:
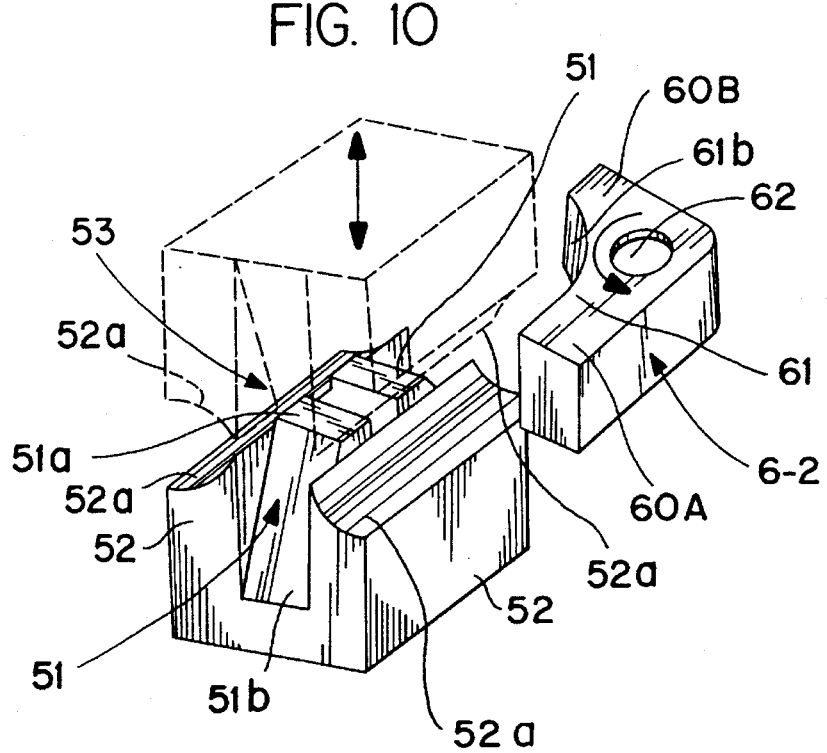
FIG. 10 is a perspective view showing a pair of holding and pressing tools which one being put on top of the other and a pair of backing tools (one backing tool is omitted.) swingable arranged at the corner of the holding and pressing tool.

As illustrated in FIGS. 9 and 10, each of the holding and pressing tools 5, 5 has a pair of holding parts 51, 51 in a truncated pyramid shape, in which end parts 51a, 51a hold the stud part 22 of the substantially ε-shaped semi-finished link 2 from both sides, and the pair of upper and lower holding and pressing tools 5, 5 is disposed so as to hold the stud part 22 from upper and lower sides. Each of the holding and pressing tools 5 also has a supporting part 52 forming a pair of parallel concave guide groove 52a, 52a having a circular-arc shaped section, which receives long-side parts 21B, 21B extending to right and left from the stud part 22. A spacing 53 is formed between an inclined side 51b of each holding part 51 and the supporting part 52 so as to receive a curved pat 11C of the substantially θ-shaped complete link 1 when a pair of the complete links are be assembled with the intermediate link 2. As illustrated in FIG. 9, when the substantially ε-shaped semi-finished stud link 2 is placed on the lower holding and pressing tool 5 and the upper holding and pressing tool 5 is put on the lower one in such a manner that the end parts 51a of the holding part 51 of the lower tool 5 are brought into contact with the opposing end parts 51a of the upper tool 5 (See FIG. 10), the substantially ε-shaped semi-finished link 2 connected with a pair of substantially θ-shaped complete link 1 from both sides is firmly held by the pair of the holding and pressing tools 5, 5.

The backing tools 6, 6 comprises a substantially L-shape block comprising a long block part 60A and a short block part 60B having each contacting part 61 and a rotation axis 62 perpendicular to a plane L including the semi-finished stud link 2 for each backing tools 6 to be horizontal-swingably supported. The backing tools 6, 6 are disposed on the pushing out side of the long-side parts 21B, 21B of the link and in such a manner that the backing tools 6, 6 opposes each other at both ends of a pair of the upper and the lower concave guide grooves 52a, 52a. Backing inside of each tools 6 is a contacting part 61 having a curved surface 61a and 61b to be brought into contact with each curved part 21C extending from each long-side part 21B of the link to each short-side part 21A.

As illustrated in FIG. 7, when the holding and pressing tools 5, 5 press in the direction shown by the arrows, each holding part 51 pushes from the inside toward the outside the long-side parts of the link 21B, 21B extending from the fixed end 22a of the stud part 22, with the stud part 22 being held by each holding parts 51. Since the curved surfaces 61a and 61b of a pair of the backing tools 6, 6 are touched by a pair of the curved parts 21C, 21C extending from the long-side parts 21B, 21B to the short-side parts 21A, 21A of the link, the pusing force from the pressing tools 5, 5 is received by a first part 60A of the backing tools 6, 6 each touching each curved part 21C. With the receiving motion of the backing tools 6, 6 each of the backing tools 6, 6 rotates in the direction shown by the arrows, which causes each second part 60B to push each short-side part 21A of the link inward. Thus the release ends 24, 24 are butted together and bending into a θ-shape is completed.

Then the butted part 25 is welded to complete the connecting operation. Such operation of connecting a pair of the substantially θ-shaped complete links 1, 1 with the substantially ϵ-shaped semi-finished link 2 is repeated to produce a chain.

As is evident from the explanation above, while the stud link chain is conventionally produced by means of bending and welding a bar steel having a uniform diameter, the stud link chain can be now produced using the substantially θ-shaped can ϵ-shaped die forged links, by which the decrease in the shearing stress applied to the shoulder part due to bending can be avoided. Further, since the welded part is minimized, steel materials superior in decrease of the shearing stress and in the tensile strength can be employed. A stud link chain which is lightweight and superior in resistance to fatigue failure can be provided in comparison with the stud link chains manufactured by the conventional methods. Accordingly anchor chains for high speed ships or traction chains for marine structures of a high quality can be provided.

Each stud link and each outer peripheral link are integrally formed and the stud link can resist large break strength, by which excellent conveyor chains or fishery chains, in which each stud is attached to a driving means, can be obtained.

Comparison tests of abrasion were carried out according to the following methods in which abrasion is applied acceleratedly to chains used for a ship, made of an SBC material by means of the present invention and by means of the conventional method.

Test Device

A fixed jig mounting a link was fixed in a vice and a jig into which a friction bar (two series of SBC 35 mm diameter×1 m long, weight 7.5 kgf×2 pieces) was built was set at an attachment part of a turning tool. Then a reciprocating motion was applied to the friction bar under a certain condition to apply friction to the inside of the test link.
friction distance: 23.5 cm
friction speed: 28 times/minute (one way)

Testing Method

A diameter of the friction bar was measured before a test and the friction bar was removed in every 6 hours (every 10080 times) to measure the diameter so that a quantity of abrasion could be obtained. Photographs of the friction appearances were taken every time the friction bar was removed. Here the quantity of the friction by 10% of a link having a diameter of 32 mm (nominal) was determined as a boundary value and relation between the number of the friction and the quantity of the abrasion was shown.

Results of the Tests

Figure 6:
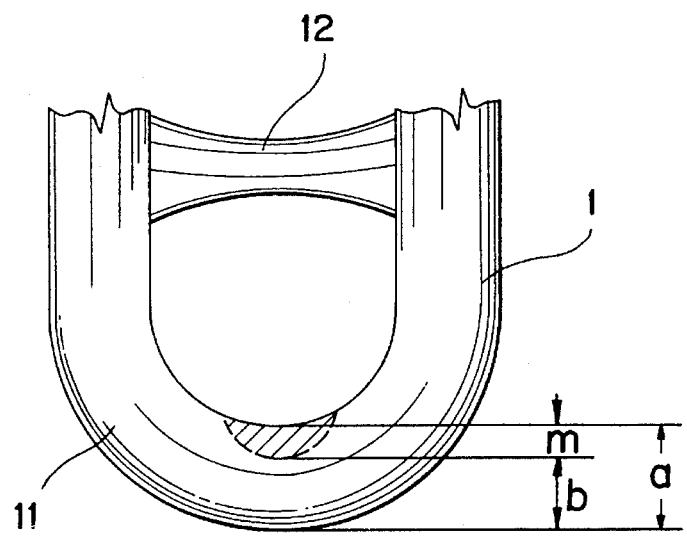
FIG. 6 is a schematical view showing a ratio of the abrasion of the link.

As to the chain of the present invention and the conventional chain, measured diameters b, quantities of the abrasion mm and % of abrasion m/a, as shown in FIG. 6, for total numbers of the friction were measured. The results are shown in Table 1.

Figure 11:
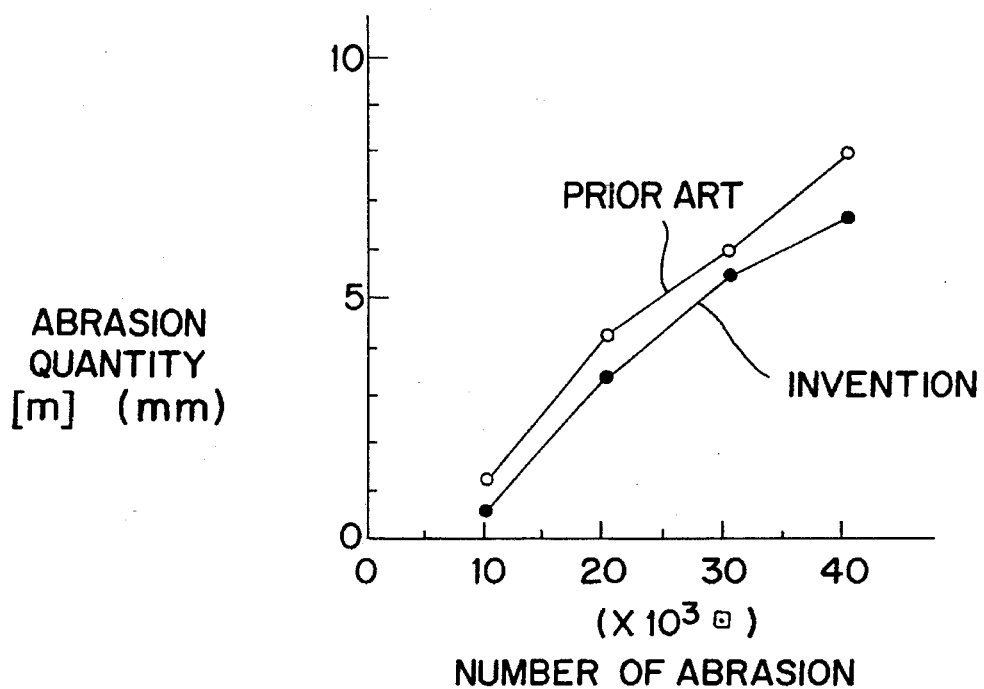
FIG. 11 is a graph showing the relation between the number of friction and the abrasion quantity in the abrasion tests.
Figure 12:
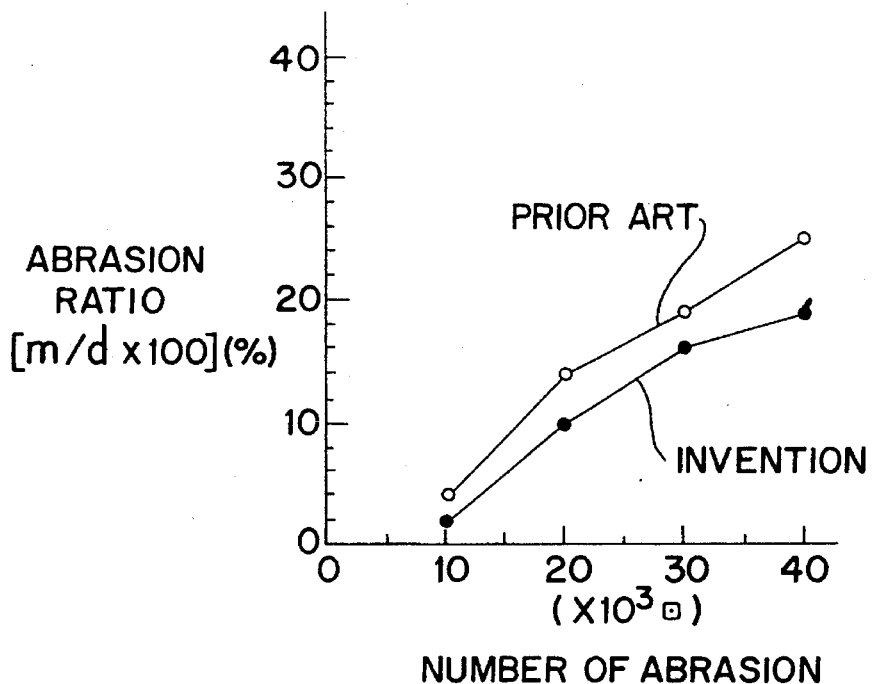
FIG. 12 is a graph showing the relation between the number of friction and the abrasion percentage in the abrasion tests.

The quantities of abrasion up to 10000 times were a few. This is supposedly because the friction bars and the friction surfaces needed a work to fit. In every step, the quantities of abrasion were less in the chain of the present invention than in the conventional chain (See FIG. 11). Since the chains of the same material (hardness) and in the same shape (diameter and circularity) were used, the quantities of abrasion should have been the same, but in this case, it is considered that the difference in diameters is concerned. When the boundary remaining quantity of the abrasion of the diameter was set at 28.8 mm, the conventional product reached the boundary remaining quantity of the abrasion at 18,400 times. It generally takes five years to decrease the diameter by 10%. This means that 18,000 times in the acceleration test corresponds to approximately five years. As to the chain of the present invention, it took 40,000 times to reach the boundary remaining quantity of the abrasion, which corresponds to approximately eleven years. This is approximately the same years of endurance as those of a ship (See FIG. 12).

What is claimed is:
1. A method for producing a stud link chain which comprises the following steps:
   (a) die forging a pair of closed links, each closed link being integrally formed and including two link parts separated by a stud part, each closed link having two short sides and two long sides, the short sides each being elliptically-shaped in cross section with the major diameter of the ellipse lying in the same plane as a center-line of the stud part, and the minor diameter of the ellipse generally corresponding to an average diameter of the link;
   (b) die forging an open link in which two link parts separated by a stud part are integrally formed, each open link having an opening part formed between open end portions of said two link parts and sufficient to insert a link part of one of the closed links made in step (a), each open link having two short sides and two long sides, the long sides being elliptically-shaped in cross section with the minor diameter of the ellipse lying in the same plane as a center-line of the stud part, and the short sides being elliptically-shaped in cross section with the major diameter of the ellipse lying in the same plane as said center-line of the stud part, the minor diameter of the short sides generally corresponding to an average diameter of the link, and the major diameter of the long sides generally corresponding to the average diameter of the link;
   (c) assembling each of the closed links into the opening part of the open link so as to lie on opposite sides of the stud part to thereby form a chain portion;
   (d) bending each link part of the open link shut to that the open end portions of the link parts abut one another to thereby form abutting end portions;
   (e) welding the abutting end portions together.
2. The method of claim 1, wherein step (e) includes welding the stud part to the abutting end portions.
3. The method of claim 2, wherein a region on each side of the stud of the open link is made of slightly increased cross section so that a reduced diameter as a result of step (d) will be compensated for after each link part is bent.

4. The method of claim 1, wherein the bending shut of each link part does not bend each link part more than 45°.

5. The method of claim 1, wherein one end of the stud part of the closed links formed in step (a) is not joined to the link parts.

6. The method of claim 1, wherein the steps (a) to (e) are repeated so as to form additional lengths of chain, and wherein these additional lengths of chain are joined together using links made as in step (b) and assembled in a similar manner as in steps (d) and (e) so as to form a chain of multiple sets of links.

7. The method of claim 2, wherein the steps (a) to (e) are repeated so as to form additional lengths of chain, and wherein these additional lengths of chain are joined together using links made as in step (b) and assembled in a similar manner as in steps (d) and (e) so as to form a chain of multiple sets of links.

8. The method of claim 3, wherein the steps (a) to (e) are repeated so as to form additional lengths of chain, and wherein these additional lengths of chain are joined together using links made as in step (b) and assembled in a similar manner as in steps (d) and (e) so as to form a chain of multiple sets of links.

9. The method of claim 4, wherein the steps (a) to (e) are repeated so as to form additional lengths of chain, and wherein these additional lengths of chain are joined together using links made as in step (b) and assembled in a similar manner as in steps (d) and (e) so as to form a chain of multiple sets of links.

10. The method of claim 5, wherein the steps (a) and (e) are repeated so as to form additional lengths of chain, and wherein these additional lengths of chain are joined together using links made as in step (b) and assembled in a similar manner as in steps (d) and (e) so as to form a chain of multiple sets of links.

11. A die forged stud link chain produced by the method of claim 1.

12. A die forged stud link chain produced by the method of claim 2.

13. A die forged stud link chain produced by the method of claim 3.

14. A die forged stud link chain produced by the method of claim 4.

15. A die forged stud link chain produced by the method of claim 5.

16. A die forged stud link chain produced by the method of claim 6.

* * * * *